United States Patent
Zhou et al.

(10) Patent No.: US 11,501,930 B2
(45) Date of Patent: Nov. 15, 2022

(54) LOW PROFILE BLOW-ON FORCE AUTOMATIC SWITCH

(71) Applicant: Cummins Power Generation IP, Inc., Minneapolis, MN (US)

(72) Inventors: Wangwei Zhou, Shoreview, MN (US); Nicholas O. Hanson, Andover, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 629 days.

(21) Appl. No.: 16/204,203

(22) Filed: Nov. 29, 2018

(65) Prior Publication Data

US 2019/0096595 A1    Mar. 28, 2019

Related U.S. Application Data

(62) Division of application No. 15/331,660, filed on Oct. 21, 2016, now Pat. No. 10,163,585.

(Continued)

(51) Int. Cl.
*H01H 53/00* (2006.01)
*H01H 3/28* (2006.01)
(Continued)

(52) U.S. Cl.
CPC ............... *H01H 3/28* (2013.01); *H01H 1/22* (2013.01); *H01H 1/54* (2013.01); *H01H 3/222* (2013.01);
(Continued)

(58) Field of Classification Search
CPC ............ H01H 23/00; H01H 9/00; H01H 9/34; H01H 9/0072; H01H 1/12; H01H 3/28;
(Continued)

(56) References Cited

U.S. PATENT DOCUMENTS 2,601,422 A    6/1952   Thumim
4,021,678 A    5/1977   Moakler et al.
(Continued)

FOREIGN PATENT DOCUMENTS

CN   202443868    9/2012
EP   2 251 881    11/2010
(Continued)

OTHER PUBLICATIONS

Examination Report for Indian Application No. 201847018302, dated Dec. 30, 2019, 8 pages.
(Continued)

*Primary Examiner* — Shawki S Ismail
*Assistant Examiner* — Lisa N Homza
(74) *Attorney, Agent, or Firm* — Foley & Lardner LLP

(57) ABSTRACT

Systems of automatic transfer switches (ATS) are disclosed herein. One apparatus includes at least two automatic transfer switches coupled together. Each automatic transfer switches has contacts to couple a power source to a load. For each switch, an electromagnetic force biasing the contacts to each other is present if an electrical current flows through the switch. The automatic transfer switches may be on separate cassettes or on a single cassette. The power source of each switch may be the same or different.

20 Claims, 10 Drawing Sheets

Related U.S. Application Data

(60) Provisional application No. 62/245,753, filed on Oct. 23, 2015.

(51) Int. Cl.
  *H01H 1/54* (2006.01)
  *H01H 3/22* (2006.01)
  *H01H 1/22* (2006.01)
  *H01H 77/10* (2006.01)
  *H02J 4/00* (2006.01)
  *H02J 9/06* (2006.01)
  *H01H 1/42* (2006.01)
  *H01H 9/40* (2006.01)

(52) U.S. Cl.
  CPC ............... *H01H 77/10* (2013.01); *H02J 4/00* (2013.01); *H02J 9/061* (2013.01); *H01H 1/42* (2013.01); *H01H 9/40* (2013.01); *H01H 2300/018* (2013.01)

(58) Field of Classification Search
  CPC .... H01H 3/46; H01H 67/00; H01H 2205/002; H01H 3/222; H01H 1/22; H01H 1/42; H01H 1/54; H01H 77/10; H01H 9/40; H01H 2300/018; H02J 4/00; H02J 9/061
  USPC ........................................................ 335/177
  See application file for complete search history.

(56) References Cited

U.S. PATENT DOCUMENTS

| | | |
|---|---|---|
| 4,157,461 A | 6/1979 | Wiktor |
| 4,168,407 A | 9/1979 | Wiktor |
| 4,405,867 A | 9/1983 | Moakler et al. |
| 4,423,336 A | 12/1983 | Iverson et al. |
| 5,070,252 A | 12/1991 | Castenschiold et al. |
| 5,077,485 A | 12/1991 | Rashid |
| 5,081,367 A | 1/1992 | Smith et al. |
| 5,200,586 A | 4/1993 | Smith et al. |
| 5,581,133 A | 12/1996 | Smith et al. |
| 6,534,737 B1 * | 3/2003 | Rademacher ............ H01H 1/60 200/1 V |
| 6,764,157 B2 | 7/2004 | Lee et al. |
| 6,765,157 B2 | 7/2004 | Rademacher et al. |
| 6,919,518 B2 | 7/2005 | Rademacher et al. |
| 6,995,327 B1 | 2/2006 | Shepstone et al. |
| 8,471,659 B1 | 6/2013 | Flegel |
| 2003/0155330 A1 | 8/2003 | Rademacher et al. |
| 2004/0016627 A1 | 1/2004 | Rademacher et al. |
| 2004/0016722 A1 | 1/2004 | Rademacher et al. |
| 2006/0119325 A1 | 6/2006 | Mrowiec et al. |
| 2010/0288610 A1 | 11/2010 | Krieger et al. |
| 2011/0198203 A1 | 8/2011 | Mueller et al. |
| 2012/0205986 A1 | 8/2012 | Frampton et al. |
| 2013/0015044 A1 | 1/2013 | Lee et al. |
| 2014/0232490 A1 | 8/2014 | Plude et al. |
| 2014/0232491 A1 * | 8/2014 | Moroz ..................... H01H 3/30 335/128 |
| 2015/0371792 A1 | 12/2015 | Feng et al. |
| 2017/0117104 A1 | 4/2017 | Zhou et al. |

FOREIGN PATENT DOCUMENTS

| | | |
|---|---|---|
| KR | 20090084111 | 8/2009 |
| WO | WO-2006/126003 | 11/2006 |
| WO | WO-2015/131042 A2 | 9/2015 |

OTHER PUBLICATIONS

European Search Report Received for Application No. 16858380.5, dated Apr. 2, 2019, 6 pages.
International Search Report for PCT Patent Application No. PCT/US2016/058288, dated Jan. 13, 2017, 53 pages.

* cited by examiner

LOW PROFILE BLOW-ON FORCE AUTOMATIC SWITCH

CROSS-REFERENCE TO RELATED APPLICATIONS

This application is a Divisional of U.S. application Ser. No. 15/331,660, filed Oct. 21, 2016, which claims priority to U.S. Provisional Patent Application No. 62/245,753, filed Oct. 23, 2015, both of which are incorporated herein by reference in their entirety.

FIELD

The present disclosure relates to automatic transfer switches (ATS).

BACKGROUND

An automatic transfer switch is used to switch an electric load back and forth between power sources (e.g., a primary power source, such as a utility, and a secondary power source, such as a generator). Transferring power from the primary to the secondary source happens, for example, when the utility experiences a blackout. When the power outage is over, the automatic transfer switch switches the power source back to utility power.

SUMMARY

One embodiment of the disclosure relates to a system of coupled automatic transfer switches. A system of coupled automatic transfer switches, the system comprises a stationary bar and a plurality of automatic transfer switches on the stationary bar. Each of the plurality of automatic transfer switches comprises a source bar and a movable bar. The source bar is structured to connect to a corresponding power source. The movable bar is electrically coupled and rotatably connected to the stationary bar. The movable bar contacts the source bar to provide power from the corresponding power source. The movable bar is subjected to an electromagnetic force biasing the movable bar towards the source bar. The electromagnetic force is induced by current flowing through the stationary bar and the movable bar. The movable bars of the plurality of automatic transfer switches are on a same side of the stationary bar.

These and other features, together with the organization and manner of operation thereof, will become apparent from the following detailed description when taken in conjunction with the accompanying drawings.

DETAILED DESCRIPTION

Figure 1:
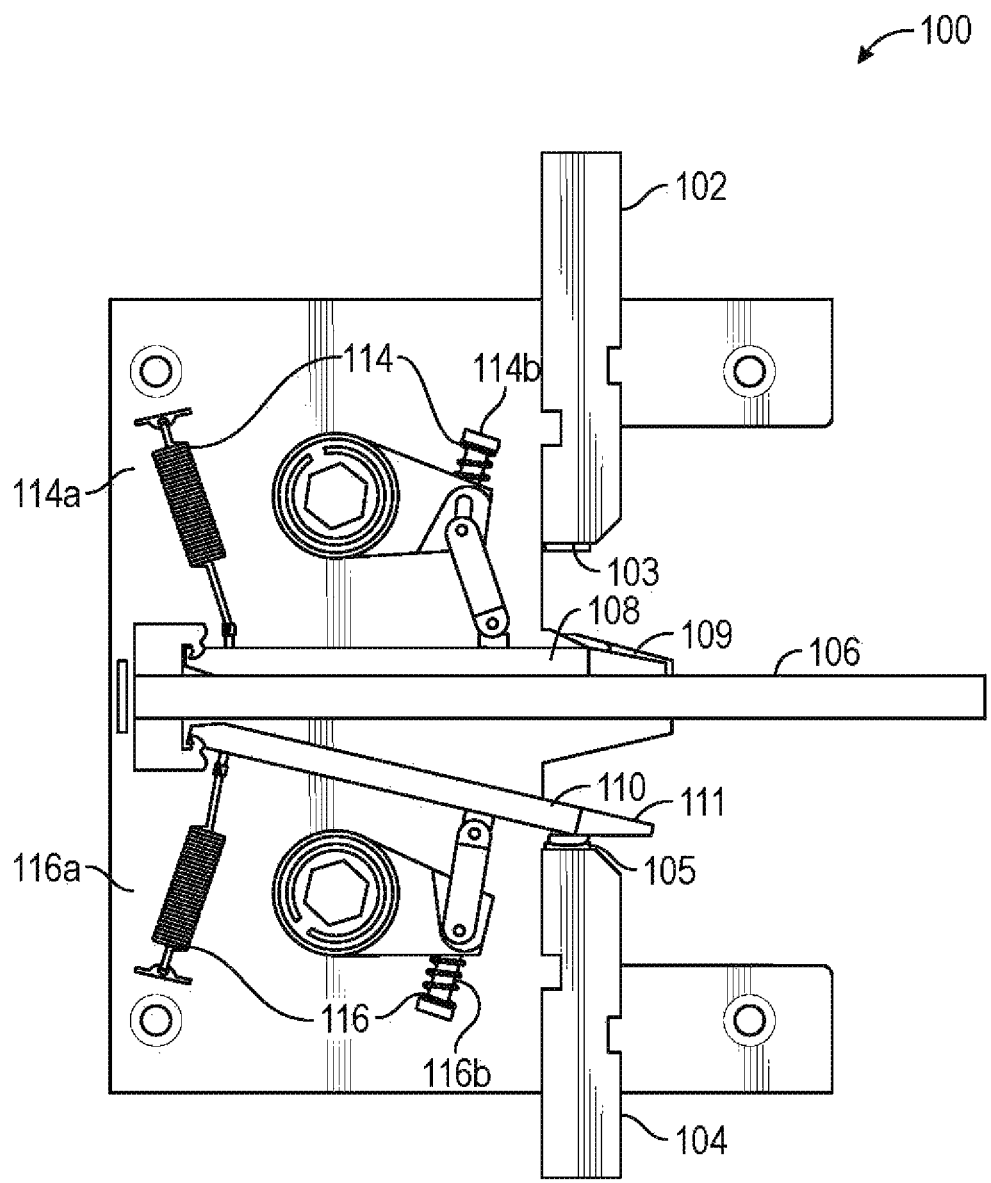
FIG. 1 is a schematic diagram of an automatic transfer switch cassette.

In the following detailed description, reference is made to the accompanying drawings, which form a part hereof. In the drawings, similar symbols typically identify similar components, unless context dictate otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

A blow-on contact automatic transfer switch utilizes a "blow-on" electromagnetic force (EMF) induced by an electrical current flowing through the switch to assist keeping together contacts that connect an electrical load to the power sources. As used herein, a blow-on force refers to the EMF force generated that biases the switch contacts towards one another and presses them together when current is flowing. The current in the switch needs to follow a proper path to generate and maintain the blow-on force. If the current does not follow the proper path through the ATS, the benefits of the blow-on contact design would be lost.

In some situations, automatic transfer switches are coupled together to serve various purposes. For example, automatic transfer switches are often coupled in a "bypass" configuration for critical power installations. In the bypass configuration, two or more automatic transfer switches are coupled in parallel and driven by a common controller. If one automatic transfer switch fails or needs maintenance, it can be automatically bypassed by the other automatic transfer switches or manually bypassed. Typically, the automatic transfer switches are connected in a way for the convenience of physical implementation of the system without considering current paths in the switches. Therefore, a design for coupling blow-on force automatic transfer switches together, such as in a bypass configuration, while preserving the appropriate current flow path and thus benefits of the blow-on contact switch is desired. With conventional ATS utilizing "blow-off" style contacts it is not critical where the electrical source is physically coupled to the switch (or the specific path the current flows through) so when in a bypass configuration the ATS switches can be coupled from the front or the back to make connection and placement in the electrical cabinet easier. In blow-on contact ATS switches, however, the current flow path matters to maintain the "blow-on" force keeping the contacts pushed together by current induced EMF. If this was not considered and a bypass configuration connection or another configuration connection taken where convenient, such as on the alternative connection on the front of an ATS switch "cassette" or switch housing as conventional blow-off ATS contacts often do, a blow-on ATS switch loses the induced EMF force and thus reverts back to being a blow-off style switch and the blow-on force benefit of the design is lost.

Referring to the figures generally, various embodiments disclosed herein relate to coupling of blow-on force automatic transfer switches. In the embodiments disclosed herein, blow-on force automatic transfer switches are coupled in such a way that, for each switch, the proper current flow path is maintained. Thus, the electromagnetic force biasing the contacts to each other is present when power is supplied via the switch. The coupled automatic transfer switches may be provided on separate cassettes or on a single cassette, and may be used as a by-pass configuration.

Referring to FIG. 1, a schematic diagram of a blow-on contact automatic transfer switch cassette 100 is shown. ATS switch housing or cassette 100 includes a first source bar 102 with a first source contact pad 103, a second source bar 104 with a second source contact pad 105, a stationary bar 106, a first movable bar 108 with a first movable contact pad 109, a second movable bar 110 with a second movable contact pad 111, a first spring and mechanical linkage 114, and a second spring and mechanical linkage 116. In some embodiments, the first source bar 102 and the second source bar 104 are fixed on the cassette 100. The first source bar 102 may be connected to a primary power source (not illustrated in the present figure), for example, a utility. The second source bar 104 may be coupled to a secondary power source (not illustrated in the present figure), for example, a generator. In some embodiments, the stationary bar 106 is also fixed on the cassette 100. The stationary bar 106 may be coupled to an electrical load (not illustrated in the present figure), for example, a resistive load and/or a motor load. The load may include appliances, lights, or other loads desirable to power in the event of a utility grid failure. In some embodiments, stationary bar 106 is a T-shaped bar.

The first movable bar 108 and the second movable bar 110 are each electrically coupled and rotatably connected to the stationary bar 106. The first and second movable bars 108 and 110 each rotate between a closed position and an open position. As used herein, the "closed position" refers to the situation in which the movable bar engages the corresponding source bar of the power source that supplies power. The "open position" refers to the situation in which the movable bar disengages the corresponding source bar of the power source that is disconnected from the load. When power is being supplied from the primary power source, the first movable contact pad 109 at an end of the first movable bar 108 engages the first source contact pad 103 at an end of the first source contact 102. The first movable bar 108 is in the closed position and the electrical load is electrically connected to the primary power source. When there is an interruption in the primary power source, the first movable bar 108 rotates from the closed position to the open position to disengage the first movable contact pad 109 from the first source contact pad 103. The second movable bar 110 rotates from the open position to the closed position to allow the second movable contact pad 111 at an end of the second movable bar 110 to engage the second source contact pad 105 at an end of the second source contact 104. The electrical load is electrically connected to the secondary power source. A similar operation is performed to transfer back to the primary power source from the secondary power source when the interruption is over. In some embodiments, the contacts pads 103, 105, 109, and 111 are made of a silver or copper alloy.

Figure 2A:
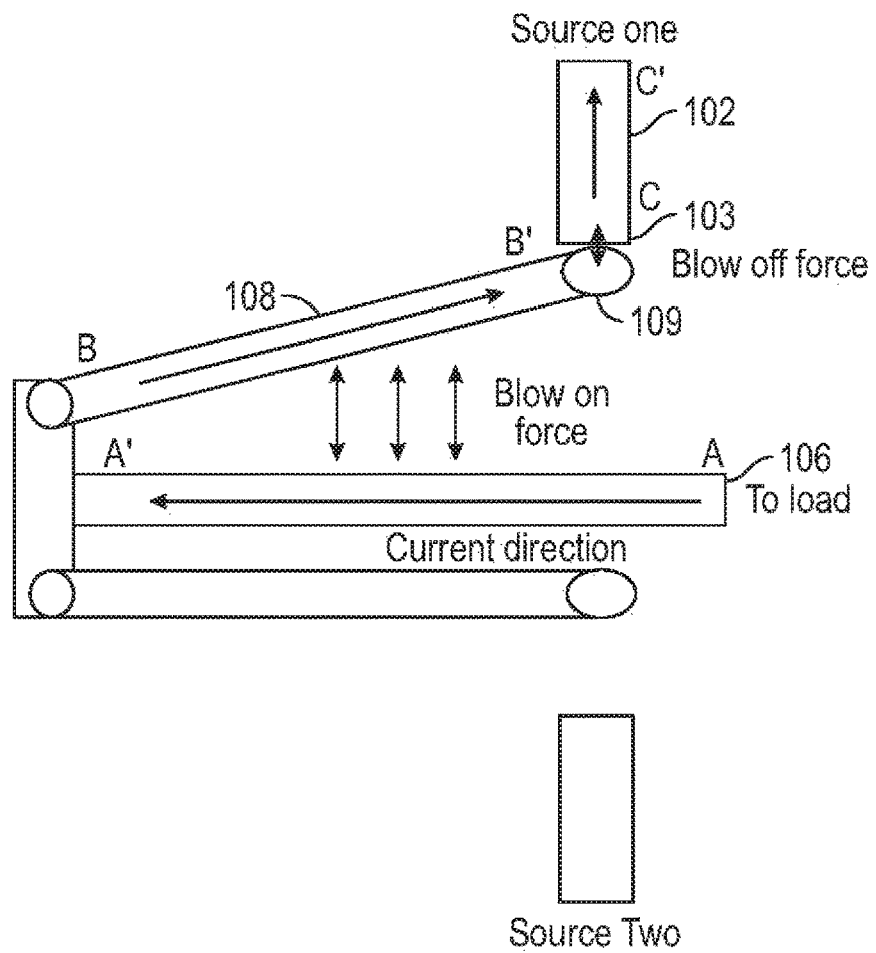
FIG. 2A is a schematic diagram of blow-on and blow-off forces on a movable bar of the automatic transfer switch of FIG. 1 at a closed position.
Figure 2B:
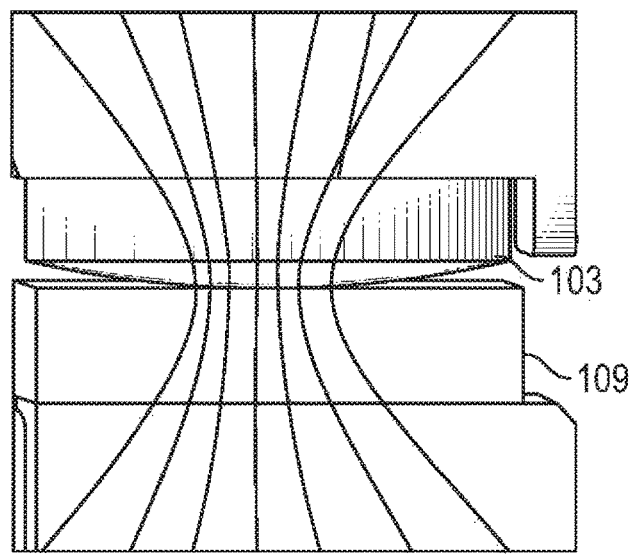
FIG. 2B is a schematic diagram illustrating current flowing through contacts of the automatic transfer switch of FIG. 1 at a closed position.

Referring to FIG. 2A, schematic diagram of blow-on and blow-off forces on a movable bar of the automatic transfer switch of FIG. 1 is shown in a closed position. The current flow path is A-A' in the stationary bar 106, B-B' in the first movable bar 108, and C-C' in the first source contact 102. Since the current flow directions are opposite in the stationary bar 106 and the first movable bar 108, an repulsive electromagnetic force is induced that pushes the first movable bar 108 away from the stationary bar 106. This is the blow-on force that biases the first movable contact pad 109 towards the first source contact pad 103 and assists the closing force provided by the first spring and mechanical linkage 114. FIG. 2B illustrates current flowing through the first movable contact pad 109 and the first source contact pad 103. As shown, the in and out currents between the first movable contact pad 109 and the first source contact pad 103 are not on the same axis but form an angle. As a result, the in current and the out current induce a repulsive electromagnetic force between the first movable contact pad 109 and the first source contact pad 103 which pushes the first movable contact pad 109 away from the first source contact pad 103. This is a blow-off force that separates the contacts apart.

Referring back to FIG. 1, the cassette 100 may further include springs to help maintain a contact force during operation. As shown in the figure, the first spring and mechanical linkage 114 includes a spring 114a that pulls from the bottom of the first movable bar 108 and a spring 114b that presses on top of the first movable bar 108. The second spring and mechanical linkage 116 includes a spring 116a that pulls from the bottom of the second movable bar 110 and a spring 116b that presses on top of the second movable bar 110. It is noted that in some embodiments, springs 114a and 114b can be combined into a single spring 114, and so can springs 116a and 116b. In some embodiments, the first spring and mechanical linkage 114 and the second spring and mechanical linkage 116 each apply about 10 N to 100 N contact force on the corresponding movable bar at the closed position.

Figure 3:
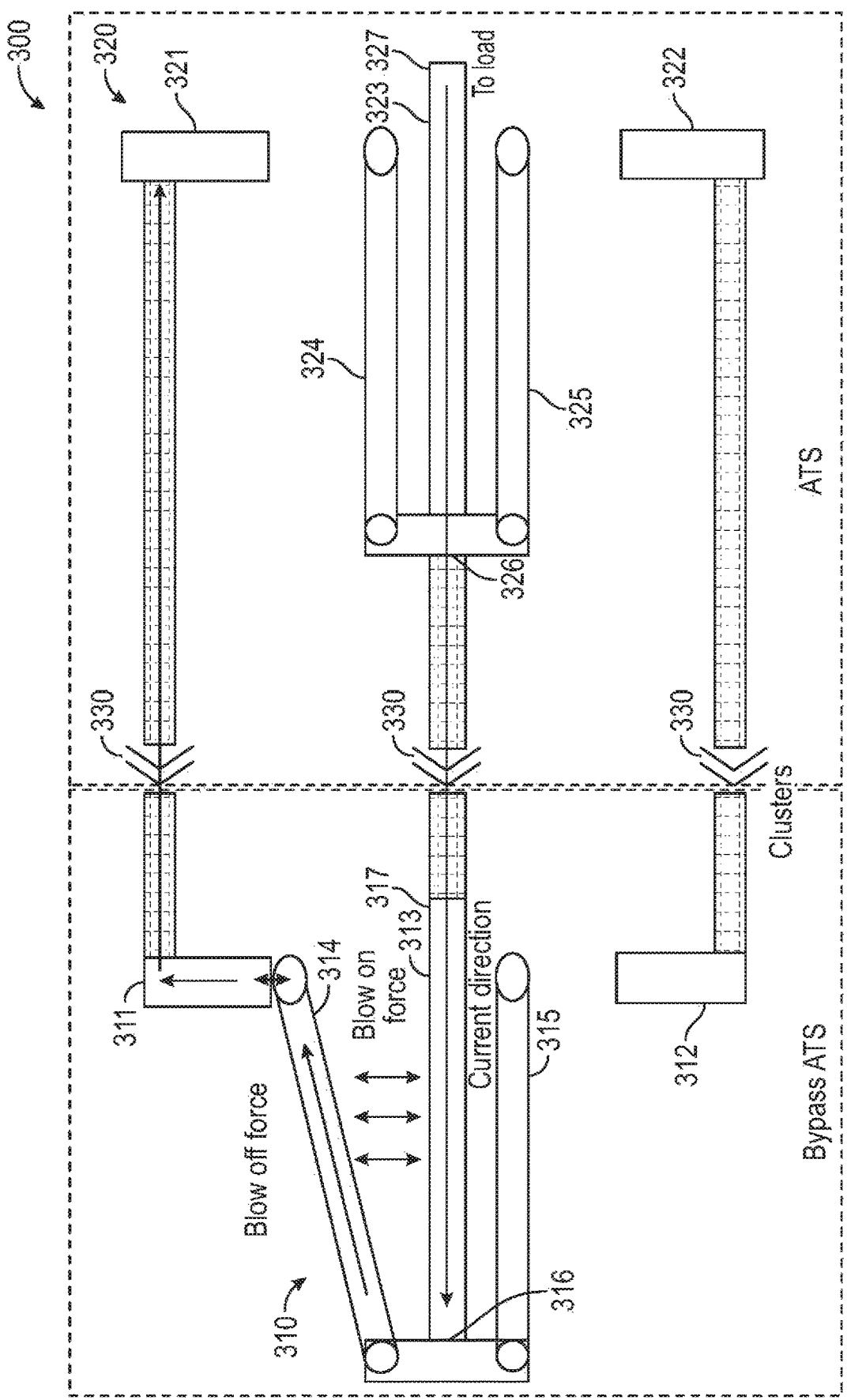
FIG. 3 is a schematic diagram of a system of coupled automatic transfer switches in a daisy-chain configuration according to an exemplary embodiment.

Referring to FIG. 3, a schematic diagram of a system 300 of coupled blow-on force automatic transfer switches 310 and 320 in a daisy-chain configuration is shown according to an exemplary embodiment. The system 300 includes a first automatic transfer switch 310 and a second automatic transfer switch 320 coupled together. It shall be appreciated that the system of two switches is given herein for example only, not for limitation. The system 300 may include any number of coupled switches. The system 300 may be used, for example, as a bypass configuration of switches for critical power installations. In the bypass configuration, two or more automatic transfer switches are coupled in parallel and driven by a common controller. If one automatic transfer switch fails, it can be automatically bypassed by the other automatic transfer switches. Typically, the automatic transfer switches are connected in a manner that is at the convenience of the physical implementation without considering current paths in the switches. However, as noted above, for the automatic transfer switches 310 and 320 to take advantage of the blow-on contact design, the current in the switch needs to follow the appropriate path through each switch, for example, from the distal ends 317 and 327 of the stationary bars 313 and 323 and through the connection ends 316 and 326 of the stationary bars 313 and 323 to the first movable bar 314 and 324 or to the second movable bars 315 and 325. Thus, the induced electromagnetic force biases the selected movable bar having the current flowing through them towards their respective source bar contact, for example, first movable bars 314 and 324 towards the first source bars 311 and 321. If the current does not follow the proper path, the benefits of the design would be lost. The system 300 maintains the proper current path for both automatic transfer switches 310 and 320 that are coupled together.

Figure 4C:
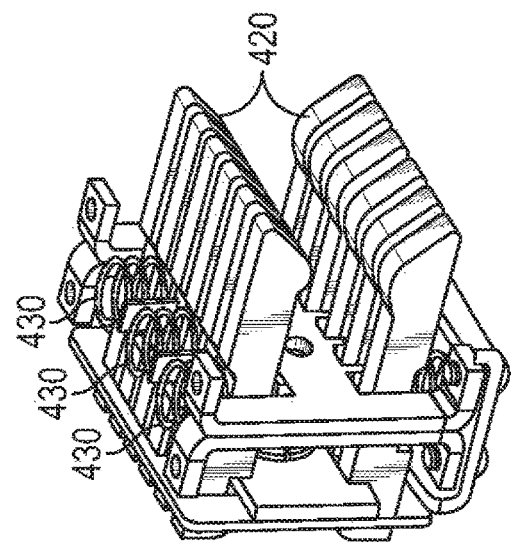
FIG. 4C is a perspective diagram of a cluster with springs mounted thereon.
Figure 4B:
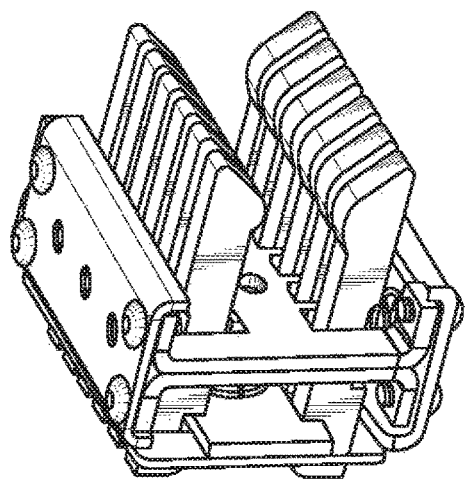
FIG. 4B is a perspective diagram of a cluster.
Figure 4A:
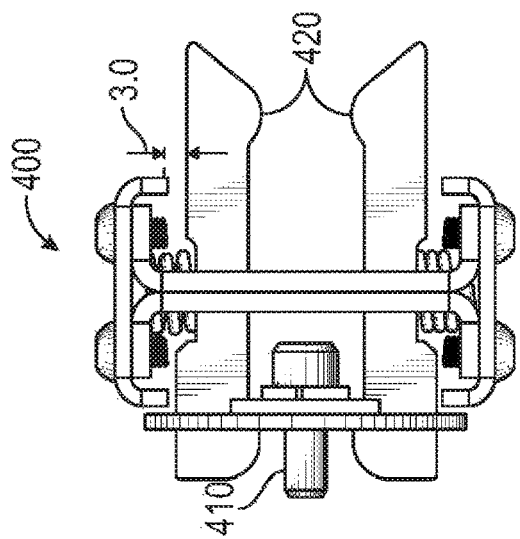
FIG. 4A is a cross sectional diagram of a cluster according to an exemplary embodiment.
Figure 5:
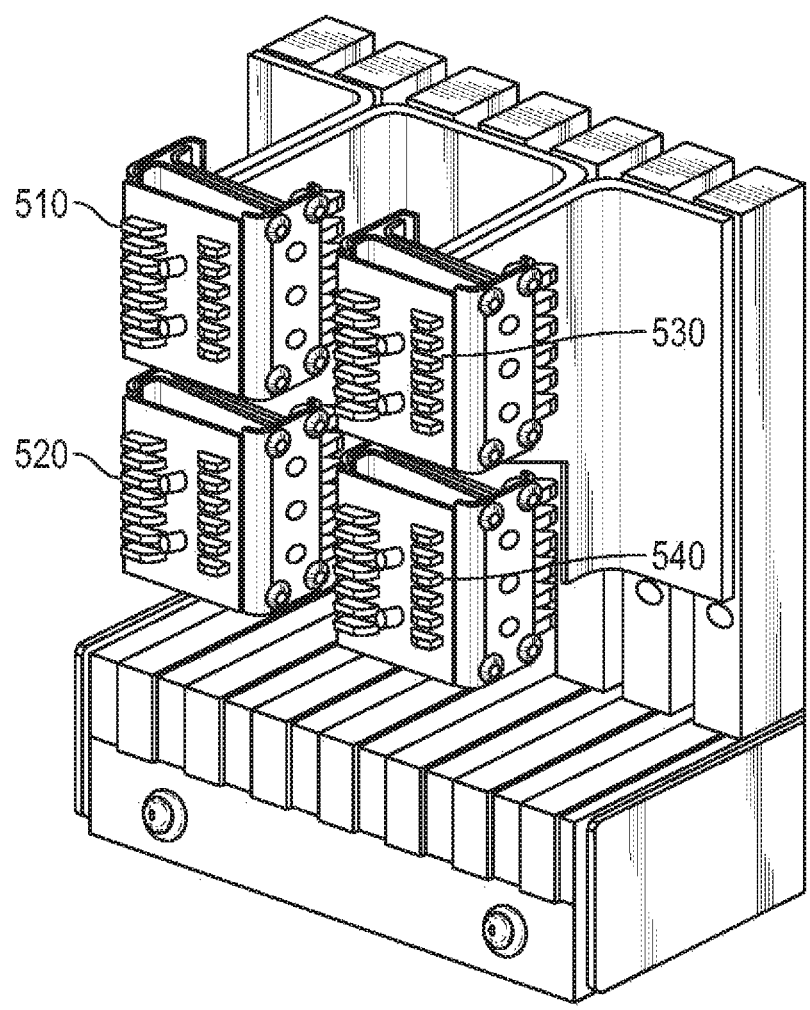
FIG. 5 is a perspective diagram of an assembly of four clusters.

As shown in the figure, the first switch 310 is coupled to the second switch 320 by daisy chaining via clusters 330. Clusters 330 are removable electrical connections that can electrically connect between two bus bars or cables in an ATS or switch gear cabinet or other installation for the ATS switches 310 and 320. Referring to FIG. 4, a cluster 400 is shown according to an exemplary embodiment. One bus bar can be mechanically mounted at one side 410 of the cluster 400. Another bus bar can be inserted between the arms 420 and pressed by springs 430 against the arms 420. In this manner, an electrical connection can be formed between the bus bars. FIG. 5 shows an assembly of four clusters 510, 520, 530, and 540 that can provide multiple electrical connections. It is noted that other electrical connections, bus bars, and/or cabling arrangements can be utilized in various embodiments, and all such alternatives are contemplated within the scope of the present disclosure.

Referring again to FIG. 3, the first switch 310 includes, among others, a first source bar 311, a second source bar 312, a stationary bar 313, a first movable bar 314, and a second movable bar 315. The stationary bar 313 has a front or movable bar connection end 316 and a back or distal end 317. The first movable bar 314 and the second movable bar 315 are each connected to the stationary bar 313 at the front end 316. The back end 317 of the stationary bar 313 may be connected to an electrical load. The second switch 320 has similar components as the first switch 310, i.e., a first source bar 321, a second source bar 322, a stationary bar 323 with a front end 326 and a back end 327, a first movable bar 324, and a second movable bar 325. In a bypass configuration, as shown, the first source bar 311 of the first switch 310 is connected to the first source bar 321 of the second switch 320. The second source bar 312 of the first switch 310 is connected to the second source bar 322 of the second switch 320. In some embodiments, the system 300 may be used in a multiple source daisy chained configuration where each source bar connects to a different source to allow for more than two sources to be selected from under control of the daisy chained ATS switches 310 and 320. In this configuration, the first source bars 311 and 321 and second source bars 312 and 322 would not be coupled in parallel, but connected to separate different sources. For example, the first source bar 311 of the first switch 310 is associated with a main utility, the second source bar 312 of the first switch 310 is associated with a second utility, and the first source bar 321 of the second switch 320 is associated with a generator as a backup power. The back end 317 of the stationary bar 313 of the first switch 310 is connected to the front end 326 of the stationary bar 323 of the second switch 320. In the system 300, proper current flow path is preserved through the stationary bars 313 and 323 for each of the first and second switches 310 and 320 to allow for the blow-on EMF force to be generated during operation. In particular, if the electrical load is connected to the power source via the first switch 310, the current flow path would be the same path as shown in FIG. 2A, which is A-A' in the stationary bar and B-B' in the first movable bar. Since the current flow directions are opposite in the stationary bar and the first movable bar, a blow-on electromagnetic force is induced that biases the first movable bar towards the first source bar. If the electrical load is connected to the power source via the second switch 320, similarly, a blow-on electromagnetic force is induced that biases the movable bar towards the corresponding source bar due to the opposite current directions in the stationary bar and the movable bar. It is noted that extra supplemental ATS switches in addition to the two shown 310 and 320 can be paralleled or daisy chained in this manner.

The system 300 may be used in the by-pass configuration where the first source bar 311 of the first switch 310 and the first source bar 321 of the second switch 320 are connected to a same first power source (not shown in the present figures). The second source bar 312 of the first switch 310 and the second source bar 322 of the second switch 320 are connected to a same second power source. When one of the first automatic transfer switch 310 or the second automatic transfer switch 320 fails, the other one will maintain power transmission. It is noted that the first switch 310 and the second switch 320 may be on a same cartridge, or on different cartridges.

Figure 6:
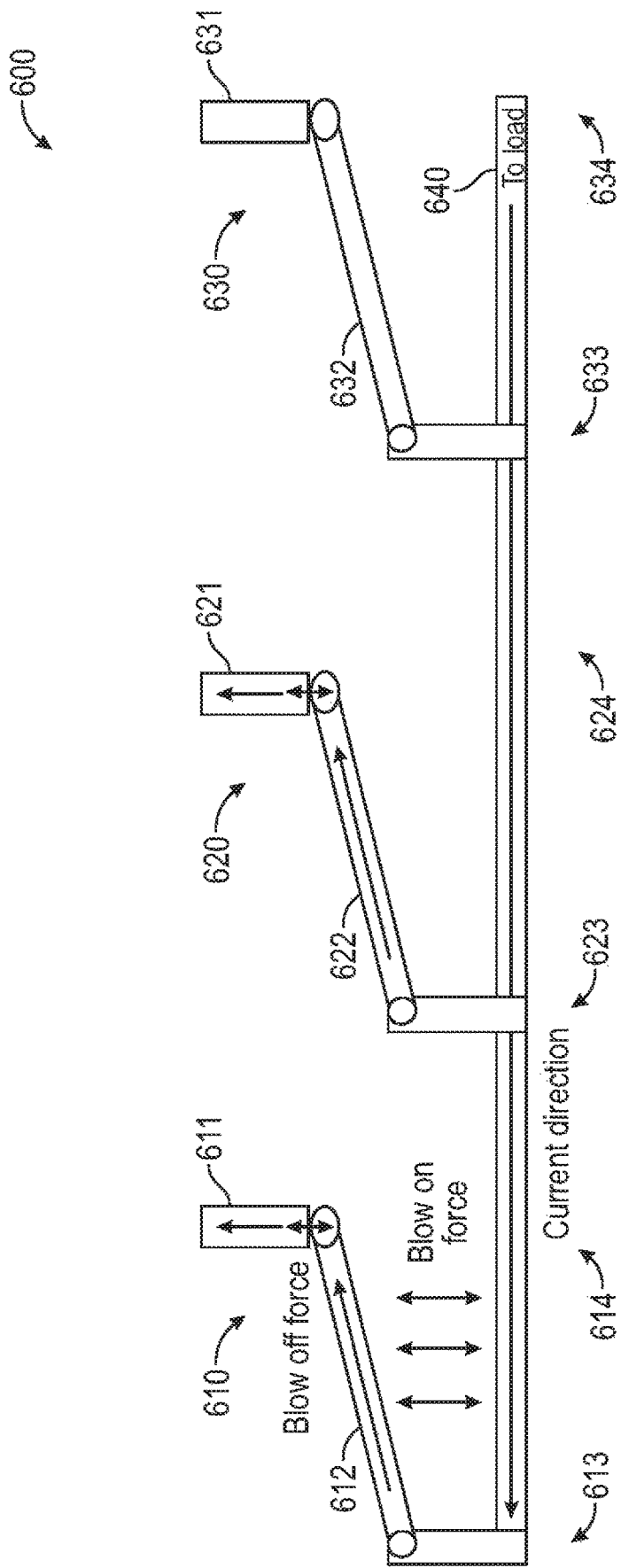
FIG. 6 is a schematic diagram of a system of coupled automatic transfer switches having source connections on a single side according to an exemplary embodiment.

Referring to FIG. 6, a schematic diagram of a system 600 of coupled automatic transfer switches having source connections on a single side is shown according to an exemplary embodiment. The system 600 includes a first single sided blow-on automatic transfer switch 610, a second single sided blow-on automatic transfer switch 620, and a third single sided blow-on automatic transfer switch 630 sharing a stationary bar 640. It shall be appreciated that the system of three switches are given herein for example only, not for limitation. The system 600 may include any appropriate number of coupled switches. It is noted that two single sided switches daisy chained as shown in FIG. 6 can be an equivalent of a single two source, double sided ATS switch, such as those illustrated in FIGS. 1-3. As shown, each of the switches 610, 620, and 630 is a "single-sided" switch, i.e., each switch has a source contact on only one side, as opposing to the "double-sided" switches shown in FIG. 3. The singled-sided design allows for lower overall profile and increased cooling at the expense of some additional length. The increased cartridge external surface area and potential exposure of and/or addition of heat sinks on the back side of the source bars 611, 621, and 631 can take heat away from the movable bar and source contact. The first switch 610 has a source bar 611 that may be connected to a first power source (not illustrated in the present figure). The second switch 620 has a source bar 621 that may be connected to a second power source (not illustrated in the present figure). The third switch 630 has a source bar 631 that may be connected to a third power source (not illustrated in the present figure). In some embodiments, the first, second, and third power sources are different. For example, the first power source may be a main utility, the second power source may be a second utility, and the third power source may be a backup power such as a generator. In other embodiments, two or more of the power sources may be the same type of switch and may be used in parallel in a redundant bypass configuration (e.g., two of the three power sources are the same and the other one is different, all three are the same, etc.).

Figure 7:
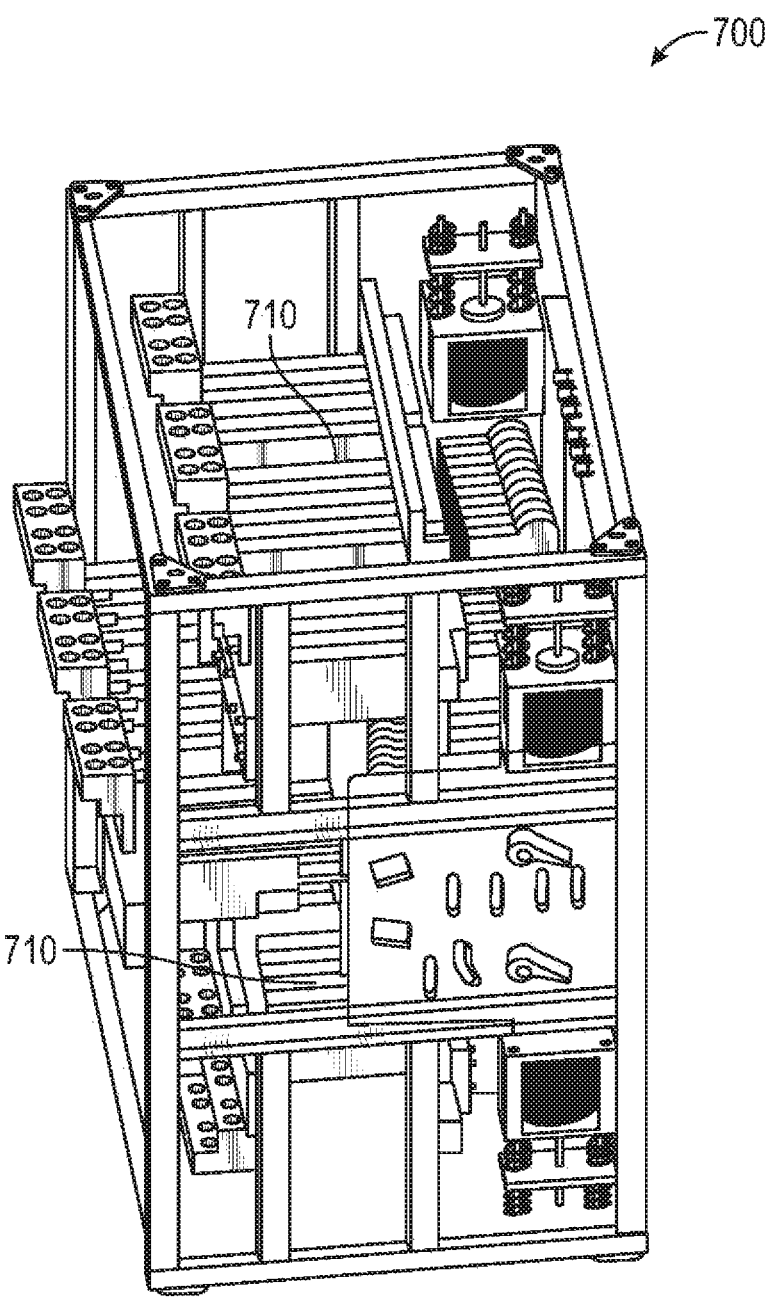
FIG. 7 is a perspective diagram of a conventional three-pole automatic transfer switch.

For the case in which the first power source is a main utility, the second power source is a second utility, and the third power source is a backup power such as a generator, the three-single-side-ATS design disclosed herein may save up to 25% cost comparing to the design using two double sided ATS switches because 50% of the footprint may be needed. FIG. 7 shows an example three-pole ATS 700. The ATS 700 has a dimension of width×height×thickness=1100 mm×850 mm×625 mm. Bus bars 710 are used for dissipating heat, which add to 30% cost and 20% weight of the ATS. By using the low-profile design illustrated in FIG. 6, long bus bars like 710 may not be needed due to better heat dissipation. Thus, the thickness of the ATS may be reduced to, for example, about 400 mm or less. It is noted that for the three source bypass configuration with main utility, second utility, and backup generator, one long single sided daisy chain may be used, two single sided daisy chains operating in parallel may be used, or, a single daisy chain of double sided blow-on switches with a different switching pattern may be used. A large parallel implementation with single/double sided blow-on switches (i.e., every switch coupled in parallel at the back or distal end to the load and the sources in parallel, or coupled to different sources) is also possible.

Referring back to FIG. 6, the first, second, and third switches 610, 620, and 630 share a stationary bar 640. The first switch 610 includes a movable bar 612 electrically coupled and rotatably connected to the stationary bar 640. The movable bar 612 is connected to the stationary bar 640 at a front end 613 of the first switch 610. The source bar 611 is disposed at a back end 614 of the first switch 610. The second switch 620 includes a movable bar 622 similar to the movable bar 612, a front end 623 where the movable bar 620 is connected to the stationary bar 640, and a back end 624 where a source bar 622 is disposed at. The third switch 630 includes a movable bar 632 similar to the movable bar 612, a front end 633 where the movable bar 630 is connected to the stationary bar 640, and a back end 634 where a source bar 632 is disposed at. The stationary bar 640 may be connected to an electrical load at the back end 634 of the third switch 630. In the system 600, proper current flow path is preserved from the back end of the stationary bar through the movable bar to the source bar to generate the blow-on force EMF for each of the first switch 610, the second switch 620, and the third switch 630. If the electrical load is connected to the power source via the first switch 610, the current flow path would be the same path as shown in FIG. 2A, which is A-A' in the stationary bar and B-B' in the movable bar. Since the current flow directions are in opposite directions in the stationary bar and the movable bar, a blow-on electromagnetic force is induced that biases the movable bar towards the source bar. If the electrical load is connected to the power source via the second switch 420 or the third switch 430, similarly, a blow-on electromagnetic force is induced that biases the movable bar towards the corresponding source bar due to the opposite current directions in the stationary bar and the movable bar. In addition, increased heat dissipation and space for air flow cooling is allowed for with the design, in many cases allowing for size, weight, and material reductions during implementation due to reduced size and reduction in bus bar size and length.

As shown in FIGS. 3 and 6, the benefits of blow-on force design can be preserved for multiple automatic transfer switches coupled on a single cassette or by a daisy chain. In the single cassette implementation, one housing couples multiple source terminals to a stationary bar. In the daisy chain implement, two or more source terminals on separate cassettes are coupled together, for example, via a "cluster" connector on the stationary bar.

Figure 8A:
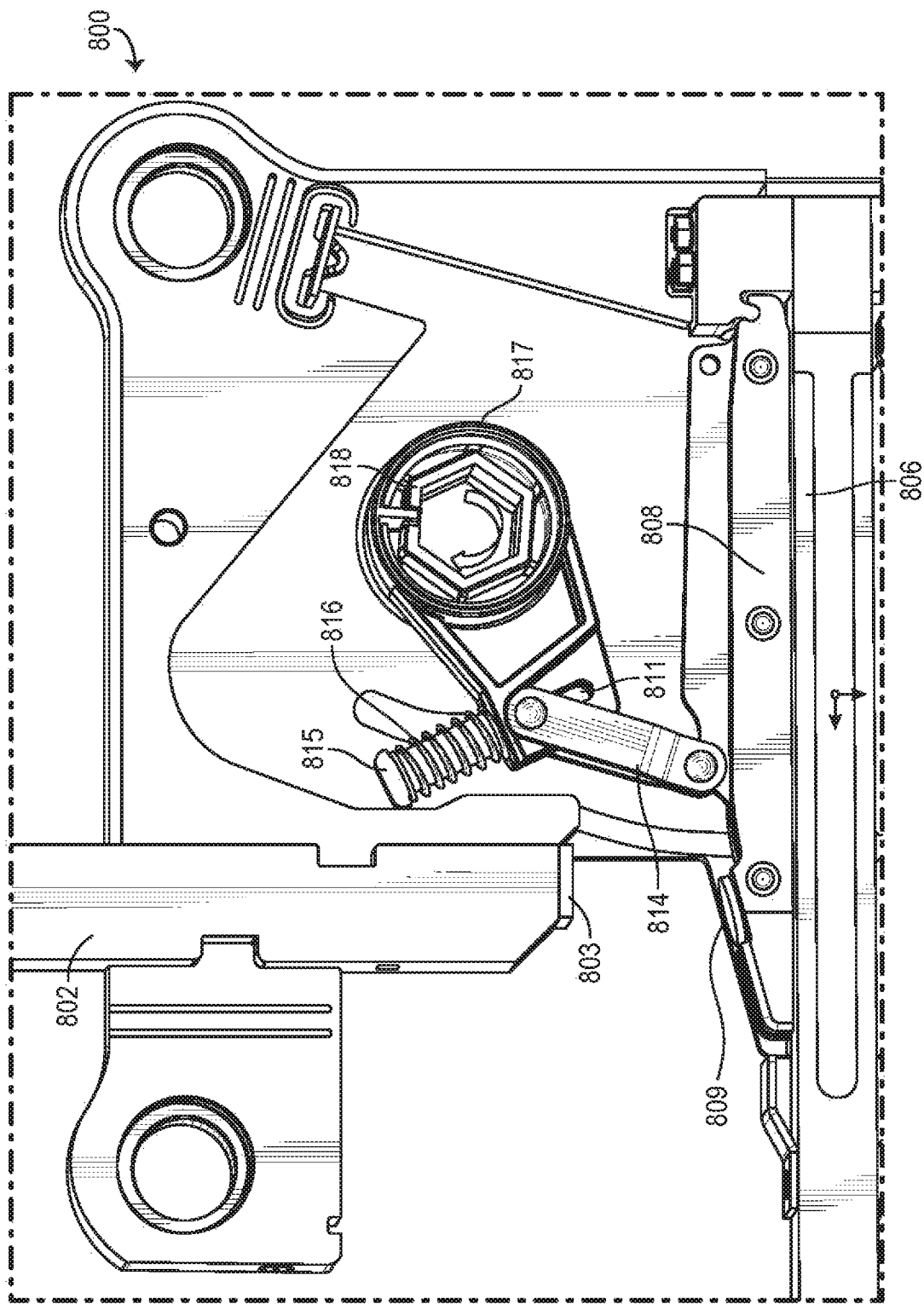
FIG. 8A is a schematic diagram of an anti-bounce blow-on contact automatic transfer switch cassette at an open position.
Figure 8B:
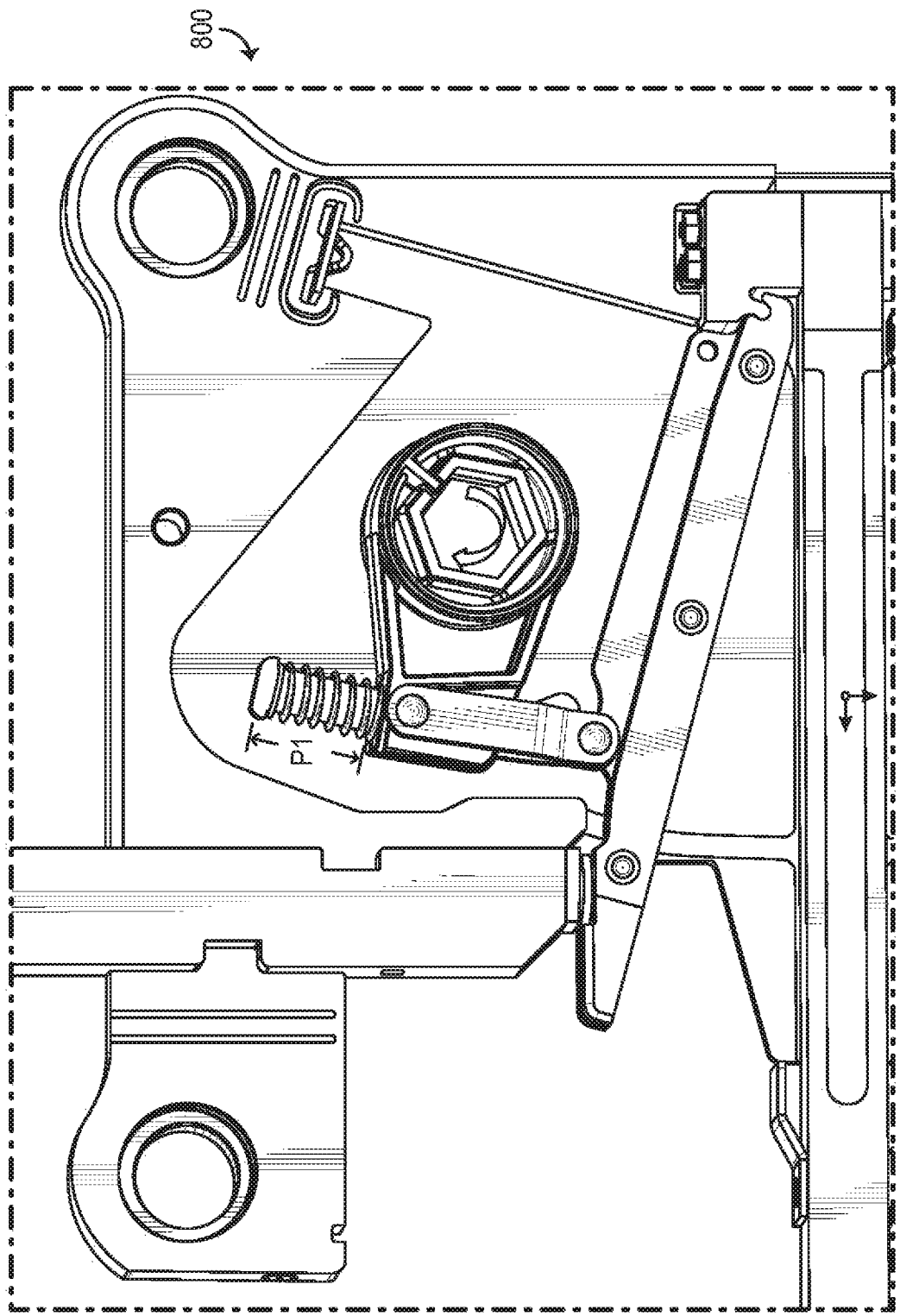
FIG. 8B is a schematic diagram of the anti-bounce blow-on contact automatic transfer switch cassette of FIG. 8A at an initial closed position.
Figure 8C:
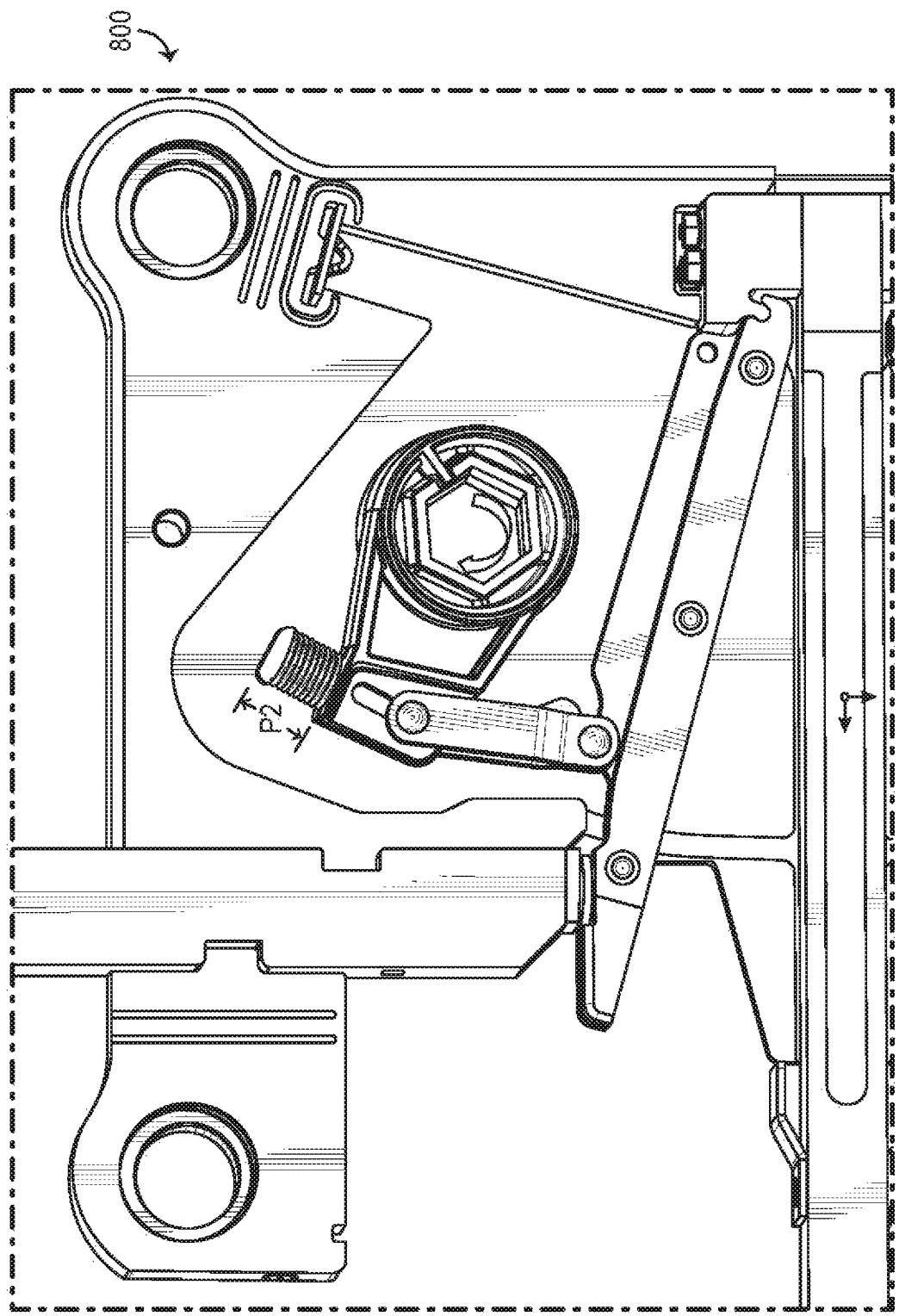
FIG. 8C is a schematic diagram of the anti-bounce blow-on contact automatic transfer switch cassette of FIGS. 8A and 8B at an ultimate closed position.

The design disclosed herein can be implemented on various types of blow-on contact ATS, for example, on an anti-bounce blow-on contact ATS. Upon closing, contact pads on an ATS might bounce due to the blow-on force and the material elasticity of the contact pads. Although lasting only a few milliseconds, a bounce might cause arcing that can damage the contact pads. An anti-bounce blow-on contact ATS can reduce the bounce back of the contact pads by gradually pressing the contact pads against each other upon closing. In particular, FIG. 8A shows an anti-bounce blow-on contact ATS cassette 800 at an open position. FIG. 8B shows the anti-bounce blow-on contact ATS cassette 800 at an initial closed position. FIG. 8C shows the anti-bounce blow-on contact automatic transfer switch cassette 800 at an ultimate closed position. The cassette 800 includes a source bar 802 with a source contact pad 803, a stationary bar 806, a movable bar 808 with a movable contact pad 809, a movable linkage 814, a T-shaped linkage 815, a spring 816, a cam 817 with a hex bar 818. The source bar 802, the stationary bar 806, and the movable bar 808 may have similar structures as the corresponding components discussed with reference to FIG. 1 The cam 817 is rotatably mounted on the cassette 800. The movable bar 808 is linked to the cam 817 through the movable linkage 814, which is coupled to the cam 817 through a slot 811. The spring 816 is wound around the T-shaped linkage 815 and coupled to the cam 817. The cam 817 can rotate along the T-shaped linkage 815 when the spring 816 is compressed. The hex bar 818 is formed within the cam 817.

Upon closing, the hex bar 818 is driven to rotate, which drives the cam 817 to rotate. The rotation of the cam 817 pulls the movable bar 808 up to the initial closed position where the movable contact pad 809 is just in contact with the source contact pad 803. At the initial position, the spring 816 is substantially not compressed and has a length of P1. When the contact pads 809 and 803 are closed at the initial position, the movement of the movable bar 808 and of the movable linkage 814 is impeded by the source bar 802. As the hex bar 818 is continually driven to rotate, the clam 817 rotates along the T-shaped linkage 815 and gradually compresses the spring 816 until an ultimate closed position is reached. At the ultimate closed position, the spring 816 is compressed and has a length of P2 shorter than P1. During the progress from the initial closed position to the ultimate closed position, the contact force between the contact pads 809 and 803 gradually increases. The initial lower contact force followed by a gradual increase of contact force helps minimize bounce back of the contact pads 809 and 803 upon closing.

While this specification contains specific implementation details, these should not be construed as limitations on the scope of any inventions or of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

The construction and arrangements of the ATS systems as shown in the various exemplary embodiments, are illustrative only. Although only certain embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As may be utilized herein, the term "about" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the drawings. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A system of coupled automatic transfer switches, the system comprising:
   a stationary bar; and
   a plurality of automatic transfer switches on the stationary bar, each of the plurality of automatic transfer switches comprising:
      a source bar structured to connect to a corresponding power source; and
      a movable bar electrically coupled and rotatably connected to the stationary bar, wherein the movable bar contacts the source bar to provide power from the corresponding power source, wherein the movable bar is subjected to an electromagnetic force biasing the movable bar towards the source bar, and wherein the electromagnetic force is induced by current flowing through the stationary bar and the movable bar,
   wherein the movable bars of the plurality of automatic transfer switches are disposed at a same side of the stationary bar; and
   wherein each of the movable bars is coupled to the stationary bar via a post, each respective post extending in a direction substantially perpendicular to the stationary bar, wherein each post and each movable bar respectively coupled thereto is spaced from an adjacent post and movable bar by a distance along the stationary bar.

2. The system of claim 1, wherein the stationary bar is formed from multiple sections linked together.

3. The system of claim 2, wherein each of the plurality of automatic transfer switches has a front end and a back end, wherein the corresponding movable bar is connected to the stationary bar at the front end and the corresponding source bar is disposed at the back end.

4. The system of claim 3, wherein the plurality of automatic transfer switches are arranged on the stationary bar such that a direction of the front end to the back end is the same for each of the plurality of automatic transfer switches.

5. The system of claim 4, wherein each of the source bars of the plurality of automatic transfer switches is configured to connect to a different power source, and wherein one movable bar is in contact with the corresponding source bar at a time.

6. The system of claim 2, wherein the source bar of a first automatic transfer switch and the source bar of a second automatic transfer switch are connected to a same power source, and wherein one of the first automatic transfer switch or the second automatic transfer switch maintains power transmission upon failure of the other of the first automatic transfer switch or the second automatic transfer switch.

7. The system of claim 1, wherein at least one of the plurality of automatic transfer switches comprises a movable linkage, a T-shaped linkage, a spring, and a cam with a hex bar.

8. The system of claim 7, wherein the first movable bar is linked to the cam through the movable linkage, wherein the spring is wound around the T-shaped linkage and coupled to the cam, wherein the hex bar is structured to rotate the cam from an initial closed position to an ultimate closed position.

9. The system of claim 8, wherein at the initial closed position the first movable bar contacts the first source bar the spring is substantially not compressed, and wherein at the ultimate closed position the first movable bar is pressed against the first source bar and the spring is compressed.

10. The system of claim 1, wherein the plurality of automatic transfer switches comprises a first automatic transfer switch with a corresponding movable bar connected to a first utility, a second automatic transfer switch with a corresponding movable bar connected to a second utility, and a third automatic transfer switch with a corresponding movable bar connected to a generator.

11. The system of claim 1, wherein the movable bar of each of the plurality of automatic transfer switches (i) includes a first end and a second end, (ii) is rotatably connected to the stationary bar at the first end, and (iii) contacts the source bar at the second end, and wherein first ends of each of the respective movable bars of the plurality of automatic transfer switches are disposed at the same side of the stationary bar.

12. A system comprising:
a generator; and
a plurality of automatic transfer switches on a stationary bar, each of the plurality of automatic transfer switches comprising:
  a source bar structured to connect to a corresponding power source of a plurality of power sources, wherein the plurality of power sources comprises the generator; and
  a movable bar electrically coupled and rotatably connected to the stationary bar, wherein the movable bar contacts the source bar to provide power from the corresponding power source, wherein the movable bar is subjected to an electromagnetic force biasing the movable bar towards the source bar, wherein the electromagnetic force is induced by current flowing through the stationary bar and the movable bar, and wherein the movable bars of the plurality of automatic transfer switches are disposed at a same side of the stationary bar;
wherein the movable bar of each of the plurality of automatic transfer switches is coupled to the stationary bar via a post, the post extending in a direction substantially perpendicular to the stationary bar, wherein the post and the movable bar respectively coupled thereto is spaced from an adjacent post and movable bar by a distance along the stationary bar.

13. The system of claim 12, wherein the stationary bar is formed from multiple sections linked together.

14. The system of claim 13, wherein each of the plurality of automatic transfer switches has a front end and a back end, wherein the corresponding movable bar is connected to the stationary bar at the front end and the corresponding source bar is disposed at the back end.

15. The system of claim 14, wherein the plurality of automatic transfer switches are arranged on the stationary bar such that a direction of the front end to the back end is the same for each of the plurality of automatic transfer switches.

16. The system of claim 15, wherein each of the source bars of the plurality of automatic transfer switches is configured to connect to a different power source, and wherein one movable bar is in contact with the corresponding source bar at a time.

17. The system of claim 13, wherein the source bar of a first automatic transfer switch and the source bar of a second automatic transfer switch are connected to a same power source, and wherein one of the first automatic transfer switch or the second automatic transfer switch maintains power transmission upon failure of the other of the first automatic transfer switch or the second automatic transfer switch.

18. The system of claim 12, wherein at least one of the plurality of automatic transfer switches comprises a movable linkage, a T-shaped linkage, a spring, and a cam with a hex bar.

19. The system of claim 18, wherein the first movable bar is linked to the cam through the movable linkage, wherein the spring is wound around the T-shaped linkage and coupled to the cam, wherein the hex bar is structured to rotate the cam from an initial closed position to an ultimate closed position.

20. The system of claim 12, wherein the plurality of automatic transfer switches comprises a first automatic transfer switch with a corresponding movable bar connected to a first utility, a second automatic transfer switch with a corresponding movable bar connected to a second utility, and a third automatic transfer switch with a corresponding movable bar connected to the generator.

* * * * *